United States Patent [19]

Fischer et al.

[11] 4,045,360

[45] Aug. 30, 1977

[54] INHIBITING WAX DEPOSITION FROM A WAX-CONTAINING OIL

[75] Inventors: Paul W. Fischer, Whittier; John W. Scheffel, Fullerton, both of Calif.

[73] Assignee: Union Oil Company of California, Brea, Calif.

[21] Appl. No.: 615,837

[22] Filed: Sept. 22, 1975

[51] Int. Cl.² .................. E21B 43/00; C09K 3/00
[52] U.S. Cl. .............................. 252/8.3; 166/304; 252/8.55 B
[58] Field of Search ............ 166/304; 252/8.3, 8.55 B

[56] References Cited

U.S. PATENT DOCUMENTS

| | | | |
|---|---|---|---|
| 1,861,176 | 5/1932 | DeGroote | 252/8.3 |
| 2,364,222 | 12/1944 | Kaufman | 252/8.55 B |
| 3,481,870 | 12/1969 | Cheng et al. | 252/8.55 B X |
| 3,669,189 | 6/1972 | Fischer | 252/8.3 X |
| 3,682,249 | 8/1972 | Fischer et al. | 166/304 X |
| 3,735,770 | 5/1973 | Day et al. | 252/8.3 X |

Primary Examiner—Herbert B. Guynn
Attorney, Agent, or Firm—Richard C. Hartman; Dean Sandford; Gerald L. Floyd

[57] ABSTRACT

A method for inhibiting the deposition of wax onto a solid surface from wax-containing petroleum and other wax-containing oils in contact with such solid surface comprising adding to such oils a synergistic mixture of a copolymer of ethylene and a monoethylenically unsaturated ester and one or more fatty derivatives, such as a high molecular weight alcohol, a natural wax, or a fatty acid.

8 Claims, No Drawings

INHIBITING WAX DEPOSITION FROM A WAX-CONTAINING OIL

BACKGROUND OF THE INVENTION

1. Field of the Invention

This invention relates to the control of wax deposition from wax-containing oil, and more particularly to a method for inhibiting the formation of wax deposits in wells, tanks, pipelines, and other equipment used for handling crude petroleum and other wax-containing oils.

2. Description of the Prior Art

It is well known that when a crude petroleum or petroleum fraction containing paraffin wax is cooled below the solidification temperature of the wax, the wax solidifies and tends to deposit on the walls and other surfaces of equipment contacted by the cooled petroleum. The deposition and accumulation of wax-like substances on the walls and other surfaces of equipment contacted by wax-containing petroleum is a major problem in the production, transfer, storage and processing of crude petroleum and petroleum fractions containing significant amounts of wax, since the wax deposits often restrict or completely stop flow through this equipment, requiring costly cleaning to maintain the equipment in operation. More specifically, it is well known that wax-like substances deposit and accumulate on the surfaces of conduits and flow passages of wells operated for the production of wax-containing crude oils and that this wax deposition causes plugging that progressively decreases the rate of production from the well. Also, the wax-like substances deposit in pipelines, vessels and storage tanks handling wax-containing crude oil which results in a serious problem of plugging and clogging this equipment. Furthermore, deposition and accumulation of wax can cause plugging in heat exchangers and malfunctioning of valves in pumps and other apparatus employed in the treating and transportation of wax-containing crude oil and in the refining of such crude oil. The deposition and resulting accumulation of wax in well conduits and transportation, storage and treating equipment reduce the efficiency and capacity of the equipment, often necessitating frequent cleaning to maintain the equipment operational.

Various techniques for inhibiting the deposition of wax from wax-containing oils and for retarding its accumulation in wells and surface equipment have been proposed. Mechanical devices such as scrapers and the like have been employed to maintain the interior surfaces of vessels and well conduits free of wax accumulations, but these devices are both costly and complex, and in many applications are only partially effective in preventing the accumulation of wax since they function by removing wax accumulations already formed rather than preventing the accumulation from forming initially. A method for inhibiting wax deposition is desired that can be practical during normal operation and does not require the shutdown or interruption of these operations. U.S. Pat. No. 3,669,189 issued June 13, 1972 to Fischer teaches the addition to petroleum of a copolymer of ethylene and a monoethylenically unsaturated ester to inhibit wax deposition. This additive has met with some success. However there exists a need for a further improved low cost, practical method for inhibiting the deposition and accumulation of wax from wax-containing petroleum and other wax-containing oils.

Accordingly, a primary object of this invention is to provide a method for inhibiting the deposition of wax from wax-containing petroleum and other wax-containing oils, such as synthetic crude oil and shale oil, particularly those petroleums and oils containing a high concentration of wax.

Another object of the invention is to provide a method for ameliorating the deposition of wax in wells, tanks, pipelines and other equipment handling wax-containing petroleum and liquid petroleum fractions.

Still another object of the invention is to provide a satisfactory technique for producing, storing, and transporting wax-containing crude oils.

A further object of the invention is to provide a method for inhibiting the agglomeration of solid wax particles in a wax-containing crude petroleum.

A still further object of the invention is to provide a method for inhibiting the agglomeration of solid wax crystals in a wax-containing oil.

A yet further object of the invention is to provide a method for removing accumulated wax deposits from equipment handling wax-containing oils, such as synthetic crude oil and shale oil, particularly those petroleums and oils containing a high concentration of wax.

Other objects and advantages of the invention will be apparent from the following description.

SUMMARY OF THE INVENTION

Briefly, this invention contemplates inhibiting the deposition of wax from wax-containing petroleum and other wax-containing oils, particularly those containing a high concentration of wax, by incorporating in the wax-containing oil a small amount of a synergistic mixture of an oil-soluble or oil-dispersible copolymer of ethylene and a monoethylenically unsaturated ester and one or more fatty derivatives, such as a high molecular weight alcohol, a natural wax, or a fatty acid. The wax deposition inhibitor may be admixed into the wax-containing oil directly, or as a solution of the inhibitor dissolved in an organic solvent. Low concentrations of the agent inhibit the deposition of wax and wax-like substances from wax-containing crude petroleum and other wax-containing oils and reduce the tendency of these substances to accumulate in wells, tanks, vessels, pipelines and other equipment contacted by the wax-containing oil.

DESCRIPTION OF THE PREFERRED EMBODIMENTS

When crude petroleum or a petroleum fraction containing dissolved wax is cooled below the solidification temperature of the wax, solid wax precipitates are formed. These precipitates are mostly straight-chain paraffin hydrocarbons having empirical structures ranging from $C_{18}H_{38}$ to $C_{38}H_{78}$. While the solid precipitates can be either crystalline or amorphous, it is generally believed that in most cases paraffins precipitate from crude oil as spiny crystals having arms radiating out from a central nucleus. These crystals agglomerate or bunch together because of their spiny structures, and oil can be occluded within this structure. It is known that wax tends to deposit more readily on rough surfaces than on a more smooth surface. Attachment to the rough metal surfaces on the interior of well conduits, pipelines, tanks, vessels and the like probably occurs through a somewhat similar process. Usually, once deposition starts, agglomeration continues until the conduit is completely plugged.

While the exact mechanism by which the wax deposition inhibitors of this invention inhibit the deposition of wax is not completely understood, it is believed that they function by reducing agglomeration of the wax crystals so that they are more readily kept in suspension and exhibit less tendency to adhere to solid surfaces. Also, these inhibitors may affect the deposition or attachment of the wax crystals to the metal surfaces which they contact. Thus, while it is believed that these inhibitors do not greatly affect the size and general appearance of individual wax crystals, they do affect the tendency of the crystals to agglomerate and to adhere to metal surfaces. However, although the exact mechanism by which the inhibitors of this invention inhibit wax deposition from a wax-containing oil may not be completely understood, it has nevertheless been conclusively demonstrated that low concentrations of these agents are effective in inhibiting the deposition of wax in well conduits, pipelines, tanks and like equipment handling wax-containing oil at a temperature below the solidification temperature of the wax. The term wax "deposition" is used herein to mean the precipitation and accumulation of wax and wax-like materials on the surfaces contacted by a wax-containing oil, and not merely the precipitation of wax crystals or particles that remain dispersed in the oil.

Also, it has been observed that the wax deposition inhibitors of this invention not only inhibit the deposition of wax and wax-like materials on metal surfaces which they contact, but also will in at least some cases disperse previously accumulated deposits of wax. Accordingly, the wax deposition inhibitors of this invention have utility both in inhibiting the deposition and accumulation of wax on surfaces contacted by a wax-containing oil and in removing previously deposited wax from such surfaces.

The wax deposition inhibitors useful in the practice of this invention comprise a synergistic mixture of a substantially linear addition copolymer of ethylene and a monoethylenically unsaturated ester and one or more fatty derivatives, such as a high molecular weight alcohol, a natural wax or a fatty acid.

The copolymers of the synergistic mixture of this invention are substantially linear addition copolymers of ethylene and monoethylenically unsaturated esters such as the vinyl and allyl esters of saturated aliphatic carboxylic acids and the saturated aliphatic esters of monoethylenically unsaturated aliphatic carboxylic acids. The monoethylenically unsaturated esters that can be copolymerized with ethylene to produce the desired copolymers are characterized by the formula:

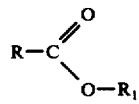

wherein (1) R is hydrogen or an alkyl group containing from about one to 25 carbon atoms and $R_1$ is a vinyl or allyl group, and preferably a vinyl group; or (2) R is an $\alpha,\beta$-unsaturated alkylene and $R_1$ is an alkyl group containing from about one to 25 carbon atoms.

Exemplary monoethylenically unsaturated esters that are copolymerizable with ethylene to form the copolymers useful in wax deposition inhibitors are the vinyl and allyl esters of formic, acetic, propionic, butyric, lauric, palmitic and stearic acids; and the saturated aliphatic esters of acrylic acid and $\alpha$-alkyl substituted acrylic acids such as methacrylic acid and the like. Also, ethylene can be copolymerized with a mixture of two or more of these esters to yield an ethylene/mixed ester copolymer.

Among the agents useful for inhibiting the deposition of wax from petroleum are copolymer ethylene/vinyl formate, copolymer ethylene/allyl formate, copolymer ethylene/vinyl acetate, copolymer ethylene/allyl acetate, copolymer ethylene/vinyl propionate, copolymer ethylene/allyl propionate, copolymer ethylene/vinyl butyrate, copolymer ethylene/allyl butyrate, copolymer ethylene/vinyl laurate, copolymer ethylene/allyl laurate, copolymer ethylene/vinyl palmatate, copolymer ethylene/allyl palmatate, copolymer ethylene/vinyl stearate, copolymer ethylene/allyl stearate, copolymer ethylene/methyl acrylate, copolymer ethylene/ethyl acrylate, copolymer ethylene/butyl acrylate, copolymer ethylene/isobutyl acrylate, copolymer ethylene/2-ethylhexyl acrylate, copolymer ethylene/methyl methacrylate, copolymer ethylene/ethyl methacrylate, copolymer ethylene/butyl methacrylate, copolymer ethylene/isobutyl methacrylate, copolymer ethylene/isodecyl methacrylate, copolymer ethylene/lauryl methacrylate, copolymer ethylene/tridecyl methacrylate, and copolymer ethylene/stearyl methacrylate.

The ethylene copolymerized with the ester tends to increase the oil solubility of the resulting copolymer. Thus, it is preferred that the copolymer contain a sufficiently high ethylene content to render it oil soluble or oil dispersible at the concentration employed. However, it has been found that increased ethylene content tends to reduce the effectiveness of the copolymer as a wax deposition inhibitor. Accordingly, it is within the scope of this invention to employ in a wax deposition inhibitor an ester polymer containing sufficient copolymerized ethylene to render the copolymer soluble or dispersible in oil.

Generally, it is preferred that the copolymer contain at least about 10 weight percent ester, and more preferably at least about 35 weight percent ester with the maximum ester content of the polymer not exceeding that amount which renders the agent insoluble or difficult to disperse in oil under the conditions of use. Also, it is generally preferred that the copolymer exhibit a melt index between about 1 and 600 grams per 10 minutes. The term "melt index" as employed herein is the flow rate reported as the rate of extrusion in grams per 10 minutes as determined by ASTM test method D1238-65T entitled "Measuring Flow Rates of Thermoplastics by Extrusion Plastometer" and performed under Standard Test Condition E, ASTM Standards, American Society for Testing Materials, Part 27, June 1969, pages 455-466, which procedure is herein incorporated by reference.

Of the foregoing ethylene/ester copolymers useful in the practice of the invention, the lower vinyl esters and the lower alkyl acrylates and methacrylates are preferred in many applications.

Preferred copolymer combinations having a special utility in wax deposition inhibitors include copolymers of ethylene and vinyl acetate, ethyl acrylate and methyl methacrylate, i.e., copolymer ethylene/vinyl acetate, copolymer ethylene/ethyl acrylate and copolymer ethylene/methyl methacrylate. One preferred class of agents particularly useful to inhibiting the deposition of wax from petroleum is ethylene/vinyl acetate copolymers containing from about 10 to 70 weight percent vinyl acetate, and more preferably containing about 35 to 55 weight percent vinyl acetate, and exhibiting a melt index between about 1 and 600 grams per 10 minutes.

A particularly preferred agent having a special utility in a wax deposition inhibitor for petroleum is an ethylene/vinyl acetate copolymer containing about 39 to 42 weight percent vinyl acetate and exhibiting a melt index between about 45 to 70 grams per 10 minutes. An ethylene/vinyl acetate copolymer of this type especially useful in a wax deposition inhibitor is marketed by the E. I. duPont de Nemours Company under the trademark ELVAX 40.

The ethylene/ester copolymers useful in wax inhibitors are prepared by generally known techniques such as by copolymerizing ethylene and the ester monomer by free radical reaction at elevated temperatures and pressures. Any of a wide variety of free radical initiators such as small quantities of molecular oxygen or other known sources of free radicals including various peroxide compounds such as benzoyl peroxide, t-butyl hydroperoxide and the like can be employed to initiate the free radical reaction. Also, the catalyst can be activated by the addition of a reducing agent such as sodium bisulfite or ferrous salts.

Operable alcohols include saturated aliphatic, unsaturated aliphatic, aromatic, alicyclic and heterocyclic monohydroxy primary, secondary and tertiary alcohols having from about 10 to about 20 carbon atoms and preferably from 10 to 16 carbon atoms. Specific alcohols which can be useful include decyl, dodecyl, tetradecyl, hexadecyl, octadecyl, eicosyl, lauryl, myristyl, cetyl, stearyl, ricinoleyl and diacetone alcohols, cyclohexanol and the like.

Natural waxes are esters of long chain fatty alcohols and acids. Vegetable, animal and insect waxes may be used. Specific waxes useful in the process of this invention include candelilla, carnauba, beeswax, bayberrymyrtle, castor bean wax, esparto grass wax, Japan wax, ouricury, retamo-ceri mimbi, shellac wax, spermaceti, sugar cane wax, and wool wax-lanolin.

Suitable fatty acids include palmitic, stearic, oleic and linoleic acids.

In practicing the method of this invention, an effective amount of the aforementioned wax deposition inhibitor is incorporated into a wax-containing crude petroleum or petroleum fraction by any convenient mixing technique. It is to be recognized that the amount of wax deposition inhibitor required depends upon the properties of the particular crude petroleum or petroleum fraction, the amount and type of wax present in the oil, the temperature to which the oil is cooled, the particular type and physical arrangement of the equipment, and the roughness of the interior surfaces contacted by the oil, the specific inhibitor combination employed, and the degree to which it is desired to inhibit wax deposition. Thus, the optimum amount of wax deposition inhibitor required in any particular application will depend upon these factors, the cost of the inhibitor, and the cost of cleaning and downtime due to wax plugging. Treatment at concentrations in excess of optimum is not only costly, but in some cases is less effective than the optimum concentration. The optimum treatment is best determined by actual field tests or by laboratory tests simulating field conditions.

Hence, broadly stated, this invention contemplates incorporating into a wax-containing crude petroleum, petroleum fraction, or other wax-containing oil an amount of the above-described ethylene/ester copolymer and fatty derivative effective to inhibit the deposition of wax from the oil. While the exact amount of agent preferred in any particular application depends on the foregoing factors, nevertheless it has been found that the effective concentration of additive is between about 5 and 10,000 ppm based on the weight of oil, and in many applications the effective concentration is between about 10 and 2,000 ppm. Thus it is within the scope of this invention to incorporate into a wax-containing oil an effective amount of the inhibitor mixture between about 5 and 10,000 ppm. and preferably between about 10 and 2,000 ppm.

While the addition of one type of fatty derivative to the copolymers of this invention results in a wax inhibitor composition of improved performance, it has been found that the presence of two or more types of fatty derivatives in the mixture results in an inhibitor composition having an even further improved performance. Particularly effective are approximately equal volume mixtures of a fatty alcohol with a natural wax or a fatty acid or a fatty acid with a natural wax.

The inhibitor mixture is made up of 1 part by weight copolymer and from about 2 to about 5 parts by weight fatty derivative.

Although the wax deposition inhibitor components can be added to the wax-containing oil directly, it is preferred that the additives be first dissolved or dispersed in an organic solvent such as naphtha, kerosene, diesel, gas oil, light crude oil, and other similar petroleum derivatives. Other suitable carriers include various lower molecular weight alcohols, ketones, alkanes, cycloalkanes and aromatic solvents such as isopropyl alcohol, methyl ethyl ketone, hexane, cyclohexane, toluene, and the like. While the concentration of inhibitor in the solution can be varied over a wide range, the inhibitor solution generally contains between 10 and 50 weight percent of the wax deposition inhibitor.

It is preferred that the wax deposition inhibitor components be added to the wax-containing oil before the oil has been cooled below the solidification temperature of the wax. While this temperature varies somewhat depending upon the particular waxes present in the wax-containing oil, it is generally preferred that the inhibitor be admixed into the wax-containing oil before the oil is cooled below a temperature of about 160° F.

While the inhibitor can be intermittently admixed with the wax-containing oil, it is preferred, particularly in continuousoperations such as in the production of oil from a producing oil well, or the flow of oil through a pipeline, that the inhibitor be continuously added to the oil during the operation. However, where the inhibitor is added for the purpose of periodically removing wax deposits from equipment, the inhibitor can be effectively injected on an intermittent basis.

In a typical oil recovery operation, oil and other fluids flow from the producing earth formation into the well and accumulate in a reservoir therein, whereupon they are transported to the surface through production tubing, either under natural pressure or assisted by pumping or gas lift. Preferably, the inhibitor is added to the reservoir of oil in the well before it cools to a temperature below the solidification temperature of the wax. Wax deposition in a producing oil well can be inhibited by adding the wax deposition inhibitor to the reservoir of oil in the well either by pumping the inhibitor down the well through a separate tubing string, such as a small diameter macaroni tubing, or by merely injecting the inhibitor into the annulus at the top of the well and allowing it to fall by gravity into the reservoir of oil in the well.

The invention is further described by the following examples which are illustrative of specific modes of practicing the invention and are not intended as limiting the scope of the invention defined by the appended claims.

EXAMPLE 1

A large number of materials of various types are tested to determine their effectiveness, when used in conjunction with a copolymer of ethylene and a monoethylenically unsaturated ester, in inhibiting the deposition of wax from a wax-containing hydrocarbon solution. A standard solution is prepared by dissolving 5 weight percent paraffin wax having a melting point of 165° F. in a composition of 70 volume percent kerosene and 30 volume percent neutral oil by heating the three component mixture to a temperature of 175° F. and stirring until a clear homogeneous liquid solution is obtained. The kerosene-neutral oil solution closely approximates the solubility properties of many crude oils. The addition of paraffin wax insures that wax will precipitate from the solution when the solution cools to room temperature. A 100 milliliter sample of the heated solution is poured into a 4 ounce bottle and 2,000 parts per million inhibitor stirred in. A stainless steel rod having a ¼ inch diameter is immersed in the solution with the upper end of the rod extending above the solution. The test solution is allowed to cool to room temperature. The physical appearance of the test solution is then noted. Next the stainless steel rod is pulled out of the test solution and visually observed to determine the amount of wax, if any, adhering to the rod.

The physical state of the test solution is rated by the following standard:

% Liquid — material contains approximately the indicated percentage of liquid with the balance being precipitated solids.

Solid — material is solid.

The amount of wax, if any, adhering to rod after pulling the same from the test solution is rated by the following standard:

Clean — no wax on the rod.

Trace — a slight amount of wax on at least some exposed portions of the rod.

Light wax — a light accumulation of wax over the exposed portions of the rod.

Waxy — a thicker accumulation of wax than the light wax.

Heavy wax — approximately a ⅛ inch or more thick coating of wax on the rod.

The results of the foregoing tests are reported in the Table.

TABLE

| Run No. | Inhibitor (parts by weight making up 2,000 ppm total inhibitor) | | | | | After cooling to Room Temperature | |
|---|---|---|---|---|---|---|---|
| | | | | | | Appearance of Test Section | Amount of Wax Remaining on Rod |
| 1 | None | | | | | Solid | Heavy wax |
| 2 | ELVAX 40* | | | | | 50% Liquid | Waxy |
| 3 | Lauryl alcohol | | | | | Solid | Trace |
| 4 | Ricinoleyl alcohol | | | | | Solid | Trace |
| 5 | Diacetone alcohol | | | | | Solid | Trace |
| 6 | Cetyl alcohol | | | | | Solid | Trace |
| 7 | Cyclohexanol | | | | | Solid | Trace |
| 8 | Beeswax | | | | | Solid | Light wax |
| 9 | Candelilla | | | | | Solid | Waxy |
| 10 | 5 | ELVAX 40 | 25 | lauryl alcohol | | 50% Liquid | Waxy |
| 11 | " | " | 25 | candelilla wax | | 50% Liquid | Waxy |
| 12 | 10 | Beeswax | 10 | lauryl alcohol | | Solid | Waxy |
| 13 | 5 | ELVAX 40 | 10 | " | 10 | beeswax | 80% Liquid | Clean |
| 14 | 4 | " | 10 | " | 10 | " | 60% Liquid | Trace |
| 15 | 3 | " | 10 | " | 10 | " | 50% Liquid | Trace |
| 16 | 2 | " | 10 | " | 10 | " | Solid | Heavy wax |
| 17 | 1 | " | 10 | " | 10 | " | Solid | Heavy wax |
| 18 | 5 | " | 10 | " | 10 | candelilla wax | 70% Liquid | Clean |
| 19 | 5 | " | 10 | ricinoleyl alcohol | 10 | " | 60% Liquid | Trace |
| 20 | 5 | " | 10 | lauryl alcohol | 10 | lanolin | 20% Liquid | Light wax |
| 21 | 5 | " | 10 | " | 10 | tallow fatty acid | 40% Liquid | Trace |
| 22 | 5 | " | 10 | " | 10 | cresylic acid | 40% Liquid | Trace |
| 23 | 5 | " | 10 | cetyl alcohol | 10 | beeswax | 50% Liquid | Light wax |
| 24 | 5 | " | 10 | octyl alcohol | 10 | " | 60% Liquid | Light wax |
| 25 | 5 | " | 10 | tall oil fatty acids | 10 | " | 60% Liquid | Clean |
| 26 | 5 | " | 10 | cresylic acid | 10 | " | 50% Liquid | Clean |
| 27 | 5 | " | 10 | tall oil fatty acids | 5 | cyclohexanol | 60% Liquid | Trace |
| 28 | 5 | " | 10 | lauryl alcohol | 10 | candelilla wax | 60% Liquid | Clean |
| | | | | | 10 | tall oil fatty acids | | |
| 29 | 5 | " | 10 | tallow fatty acid | 10 | candelilla wax | 50% Liquid | Trace |
| | | | | | 5 | stearic acid | | |

*An ethylene-vinyl acetate copolymer containing about 39 to 42 weight percent vinyl acetate, exhibiting a melt index between about 45 to 70 grams per 10 minutes and marketed by E.I. duPont de Nemours Company under the trademark ELVAX 40.

In the foregoing example, runs 1 through 9 show that some of the additives of the process of this invention, when used alone, have some effect in reducing the amount of wax which deposits on the metal rod. However, in each instance the test solution is a solid at room temperature. Runs 10 through 29 illustrate that using as a wax inhibitor a mixture of a substantial amount of a copolymer of ethylene and a monoethylenically unsaturated ester plus one or more fatty derivatives results both in a reduction in the amount of wax which deposits on the metal rod and at least a portion of the test solution remaining in the preferable liquid phase at room temperature. Runs 13 through 17 show specifically the effect of various amounts of the subject copolymer in the inhibitor mixture.

EXAMPLE 2

A well in West Texas produces a wax-containing 40° API gravity crude oil. The well has a bottom hole temperature of 140° F. The oil when produced from the well has cooled to a temperature of 110° F. The wax tends to precipitate during production and subsequent handling of the oil plugging the production tubing and other fluid-gathering equipment. This necessitates frequent shut-down for removal of the plugging material. When clean, the well produces about 37 barrels oil per day. A wellhead pressure of about 60 psig is required to pump the crude oil through the fluid-gathering equipment. After about 7 days operation, subject to wax precipitation, the production decreases to about 7 barrels oil per day and a pressure of about 250 psig is required to pump the oil.

The well is treated in accordance with the procedures of this invention as follows. To one barrel of produced crude oil is added 0.5 pound ELVAX 40 copolymer, 1 pound lauryl alcohol and 1 pound beeswax to provide a concentrated inhibitor solution. This concentrate is continuously injected into the well annulus at the rate of one barrel per day and mixes at the bottom of the tubing with the crude oil being produced up the tubing while the crude oil is still hot enough to maintain the wax in suspension. Thus the produced crude oil has an inhibitor concentration of 2,000 ppm.

The well is produced in this manner for a two month test period with no significant reduction in oil production rate or increase in wellhead pressure.

Various embodiments and modifications of this invention have been described in the foregoing specification, and further modifications will be apparent to those skilled in the art. Such modifications are included within the scope of this invention as defined by the following claims.

Having now described our invention, we claim:

1. A method for inhibiting the deposition of wax from wax-containing oil comprising incorporating into said oil a wax deposition inhibitor comprising an effective amount of a mixture of (A) one part by weight of a copolymer of ethylene and a monoethylenically unsaturated ester selected from the group consisting of (1) vinyl and allyl esters of saturated aliphatic carboxylic acids and (2) saturated aliphatic esters of unsaturated aliphatic carboxylic acids, and (B) about 2 to about 5 parts by weight of one or more oxygen-containing organic compounds selected from the group consisting of high molecular weight alcohols selected from the group consisting of unsubstituted saturated aliphatic, unsubstituted unsaturated aliphatic and unsubstituted alicyclic monohydroxy alcohols having about 10 to about 20 carbon atoms, natural waxes selected from the group consisting of insect and vegetable waxes, and fatty acids selected from the group consisting of palmitic, stearic, oleic and linoleic acids.

2. The method in accordance with claim 1 wherein said monoethylenically unsaturated ester is characterized by the formula:

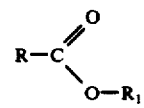

wherein (1) R is hydrogen or an alkyl group containing from about one to 25 carbon atoms and $R_1$ is a vinyl or allyl group, or (2) R is an $\alpha,\beta$-unsaturated alkylene and $R_1$ is an alkyl group containing from about one to 25 carbon atoms.

3. The method in accordance with claim 1 wherein said copolymer is ethylene/vinyl acetate, ethylene/vinyl acrylate or ethylene/methyl methacrylate.

4. The method in accordance with claim 1 wherein the said alcohols are selected from the group consisting of lauryl alcohol, ricinoleyl alcohol, cetyl alcohol and octyl alcohol.

5. The method is accordance with claim 1 wherein the said natural wax is selected from the class consisting of beeswax and candelilla wax.

6. The method in accordance with claim 1 wherein the oxygen-containing organic compounds of (B) comprise a mixture of an alcohol with either a natural wax or a fatty acid.

7. The method in accordance with claim 1 wherein the oxygen-containing organic compounds of (B) comprise a mixture of a fatty acid and a natural wax.

8. A method for inhibiting the deposition and accumulation of wax in wells, tanks and pipelines handling a wax-containing oil, which comprises incorporating into said oil a wax deposition inhibitor comprising from 5 to 10,000 parts per million of a mixture of one part by weight of a copolymer of ethylene and a monoethylenically unsaturated ester selected from the group consisting of (1) vinyl and allyl esters of saturated aliphatic carboxylic acids and (2) saturated aliphatic esters of unsaturated aliphatic carboxylic acids, and (B) about 2 to about 5 parts by weight of (A) one or more oxygen-containing organic compounds selected from the group consisting of high molecular weight alcohols selected from the group consisting of unsubstituted saturated aliphatic, unsubstituted unsaturated aliphatic and unsubstituted alicyclic monohydroxy alcohols having about 10 to about 20 carbon atoms, natural waxes selected from the group consisting of insect and vegetable waxes, and fatty acids selected from the group consisting of palmitic, stearic, oleic and linoleic acids.

* * * * *